Aug. 11, 1942.  M. B. MENTLEY  2,292,647
CUTTER HOLDER
Filed May 27, 1940   2 Sheets-Sheet 1
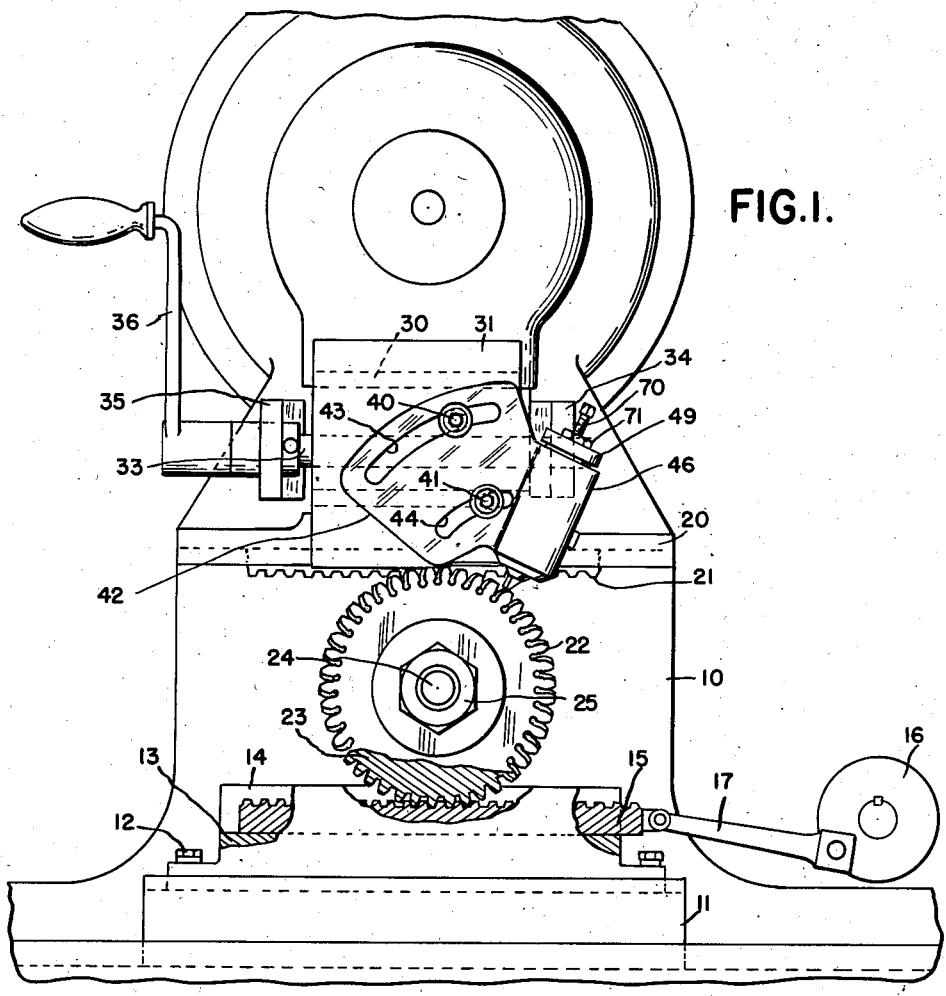
FIG.1.
FIG.4.
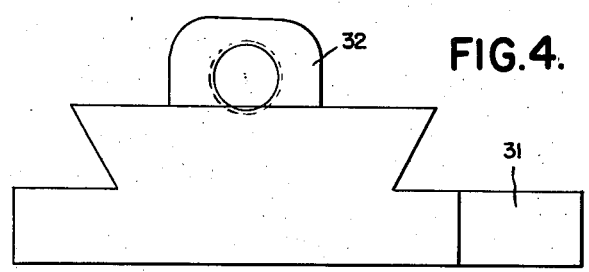
INVENTOR.
MAX B. MENTLEY
BY Whittemore, Hulbert
& Belknap   ATTORNEYS Aug. 11, 1942.          M. B. MENTLEY          2,292,647
CUTTER HOLDER
Filed May 27, 1940          2 Sheets-Sheet 2

INVENTOR.
MAX B. MENTLEY
BY Whittemore, Hulbert
& Belknap       ATTORNEYS

Patented Aug. 11, 1942

2,292,647

UNITED STATES PATENT OFFICE 2,292,647

CUTTER HOLDER

Max B. Mentley, Detroit, Mich., assignor to National Broach & Machine Company, Detroit, Mich., a corporation of Michigan Application May 27, 1940, Serial No. 337,530

11 Claims. (Cl. 90—53)

The present invention relates to a cutter holder adapted to hold a serrating blade for use in providing grooves or serrations in the faces of a gear-like gear finishing tool. The present application is a continuation in part of my copending application Serial No. 155,805, entitled "Method and machine for manufacturing rotary gear cutters," filed July 26, 1937, which relates to the complete apparatus for providing the serrations in gear teeth, and the present application is particularly concerned with novel means for holding the serrating tool.

Briefly described, the apparatus comprises a frame including means for supporting a gear-like tool blank and for moving the same with a rolling, generating motion relative to a serrating tool. It is desirable that the serrating tool shall be mounted for feeding movement in a direction parallel to the rolling motion of the tool blank and shall be variously adjustable. These adjustments comprise an adjustment about the longitudinal axis of the serrating blade to position the blade properly with respect to cutter blanks of different helix angles; an adjustment of the cutter blade about a transverse axis located substantially adjacent its cutting edge; and a longitudinal adjustment of the serrating blade to provide for feed of the blade to take up for wear.

It is accordingly an object of the present invention to provide a novel tool holder having the foregoing movements and adjustments.

It is a further object of the invention to provide a tool holder for a serrating blade including a sleeve in which the blade is longitudinally and rotatably adjustable.

It is a further object of the invention to provide in a machine of the type described a tool support including a carriage, a bracket adjustably mounted on said carriage, said bracket including a sleeve and means in said sleeve for supporting a blade-like tool for longitudinal and rotational adjustment.

Other objects of the invention will be apparent as the description proceeds, and when taken in conjunction with the accompanying drawings wherein:

Figure 1 is a front elevation of the serrating machine showing the novel cutter holder in position;

Figure 4 is an end elevation of the tool carriage; and

Figure 2:
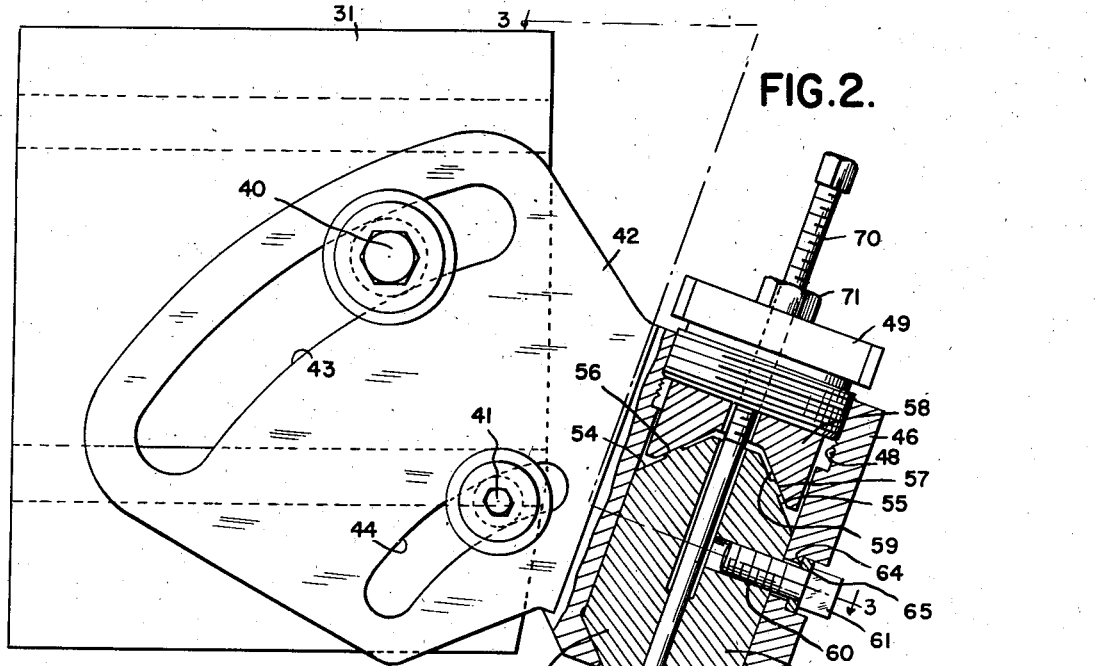
Figure 2 is an enlarged elevation of the tool supporting means with parts in section.

Referring first to Figure 1, the serrating machine comprises a frame 10 having a forwardly extending knee 11 thereon which is preferably vertically adjustable to provide for the substitution of master gear elements, as will later be described. Secured to the knee 11 as by bolts 12 or the like, I provide a longitudinally trough-shaped member 13 having upwardly extending guiding flanges 14 for the reception of a longitudinally slidable rack element 15. Suitable means are provided for reciprocating the rack 15, and these are indicated diagrammatically as a motor 16 having a crank 17 suitably connected to the slidable rack 15.

The frame 10 is provided with a second forwardly projecting portion 20 overlying the knee 11 and having a downwardly directed fixed rack 21, similar to the rack 14.

In order to mount the tool blank 22 for the desired motion relative to the serrating blade, I provide a master gear 23 having teeth conjugate to both racks 15 and 21 and received in close mesh therebetween. Preferably the racks 15 and 21 and the master gear 23 are of substantial width so that the master gear and the tool blank 22 carried thereby are supported rigidly and are moved in accurately guided relation by reciprocation of the slidable rack 15.

The master gear 23 has extending axially therefrom a stub shaft 24 adapted to receive the tool blank 22 and the tool blank 22 is rigidly locked thereon for simultaneous movement with the master gear 23 by a suitable clamping element such for example as the nut 25.

Located above the fixed rack 21, the frame 10 is provided with horizontally extending ways indicated at 30, in which is mounted for longitudinal translation a carriage 31, best seen in Figures 2 and 4. The carriage 31 has a rearwardly extending lug or projection 32 which is internally threaded for the reception of a feed screw 33, which in turn is mounted for rotation between supporting elements 34 and 35 carried by the frame 10. In Figure 1 I have illustrated a crank 36 as connected to the feed screw 33 for rotating the same, and it will be appreciated that rotation of the crank 36 results in horizontal translation of the carriage 31 in the ways 30.

Referring now more particularly to Figure 2, the carriage 31 is provided with a pair of tapped holes for the reception of locking bolts 40 and 41. These clamping bolts 40 and 41 are provided for rigidly clamping in place a bracket 42 in adjusted position, the bracket 42 being provided with arcuate slots 43 and 44 for this purpose. Arcuate slots 43 and 44 are concentric and their central curvature is located substantially adjacent a point X which is the cutting edge of the serrating blade 45. The bracket 42 carries a sleeve 46, which is herein illustrated as formed integrally thereon, but which may if desired be separately formed and secured thereto by appropriate means. The sleeve 46, as illustrated, is cylindrical and is open at the top and bottom. Adjacent its bottom, however, it is provided with a concentrically formed, inwardly extending flange 47, for a purpose which will subsequently appear.

Adjacent the upper open top of the sleeve 46 are provided threads 48 for the reception of a correspondingly threaded portion of a plug 49.

In order to clamp the blade 45 rigidly in adjusted position I provide a pair of clamping members 50 and 51. These members are each substantially semi-cylindrical in cross section and have tapered ends 52 and 53, respectively, for cooperation with the correspondingly tapered conical flange 47. The upper end of the clamping members 50 and 51 are likewise tapered as indicated at 54 and 55, respectively, and preferably these conically tapered surfaces are relieved to provide upstanding bearing surfaces 56 and 57, respectively.

An annular clamping element 58 is provided inside the cylindrical sleeve 46 and has its lower end conically formed as indicated at 59 to cooperate with the upper ends of the clamping members 50 and 51. The annular clamping element 58 is herein illustrated as separate from the plug 49, although it is apparent that if desired it might be made integral therewith.

Figure 3:
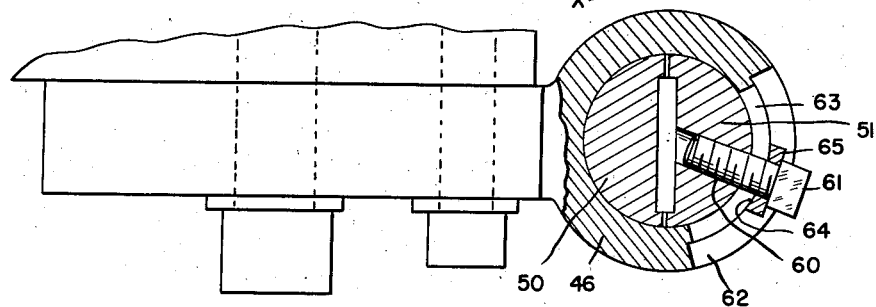
Figure 3 is a section on the line 3—3, Figure 2.
Figure 5:
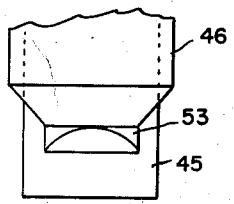
Figure 5 is a fragmentary end elevation illustrating the serrating blade in position.

One of the clamping members, as the member 51, is provided with a tapped recess 60 for the reception of a locking bolt 61, which extends through an elongated slot 62 extending circumferentially around the sleeve 46, as best seen in Figure 3. As shown in this figure, the slot 62 is stepped, having a narrower portion 63 forming shoulders 64 against which seats a correspondingly shaped washer 65.

The plug 49 is centrally apertured and is threaded for the reception of a feed bolt 70 which is adapted to extend through the plug 49 and the clamping element 58 and engage against the upper end of the serrating blade 45. I have illustrated a lock nut 71 associated with the feed bolt 70 to retain the same in adjusted position.

It will be apparent that when the plug 49 is screwed downwardly, it forces the clamping element 58 into contact with the bearing surfaces 56 and 57 of the clamping members 50 and 51. This engagement, and also the contact between the lower surfaces 52 and 53 of the clamping members 50 and 51 with the inwardly extending flange 47 of the sleeve 46, tends to move the clamping members radially inward in a manner to clamp the tool 45 rigidly therebetween. In order to adjust the serrating blade it is necessary first to loosen the threaded plug 49 in a manner to release the tool 45, after which the serrating blade or tool 45 may be adjusted longitudinally of the sleeve 46, the feed bolt 70 being employed as a stop to position the upper end of the blade 45 in the desired position. If it is desired to adjust the serrating blade 45 rotatably within the sleeve 46, this may be accomplished by loosening the lock bolt 61, and which may then be swung in the slot 62. This will in turn cause rotation of the clamping members 50 and 51 and the blade 45. It is unnecessary to provide for complete rotational adjustment of the blade 45 for the reason that this adjustment is provided for the purpose of setting the blade 45 at an angle to correspond with the helix angle of the tool blank being serrated so that the adjustment need only be sufficient to take care of the helix angles expected.

During operation of the machine the lower rack 15 is reciprocated, causing the master gear 23 to roll on the fixed rack 21 and thus imparting a corresponding rolling motion to the tool blank 22. The serrating blade 45 is adjusted into contact with a tooth surface on the tool blank, after which it may be fed by means of handle 36 until the serrations or grooves in the faces of the teeth of the tool blank have been cut to depth. The tool is indexed from tooth to tooth by loosening the clamping nut 25 and adjusting the tool blank 22 relative to the master gear 23.

The apparatus which forms the subject matter of the present invention permits the use of standard serrating blades for serrating a wide variety of tool blanks, inasmuch as adjustment is provided for setting the blade at any angle corresponding with the helix angle of the tool blank. As the serrating blade 45 is worn away by repeated resharpenings it may be fed downwardly so as to present the cutting edge always in substantially the same location. The tool supporting fixture also provides means for swinging the serrating blade about a transverse axis located substantially at the cutting edge of the blade 45, an adjustment which is desirable to render the apparatus operable on gears of different diameters and pitches.

While the present apparatus was devised primarily for use in a machine for serrating cutter teeth, it will be evident that it is equally useful in a machine for cutting gear teeth uniformly from end to end. Thus for example, instead of providing a serrating tool, a tool could be substituted having a straight uninterrupted cutting edge which would effect a uniform shaving operation over the teeth of the gear.

While I have illustrated and described only a single preferred embodiment of my improved structure, it will be understood that the same has been done only to enable those skilled in the art to practice the invention the scope of which is indicated by the appended claims.

What I claim as my invention is:

1. In a gear cutting machine of the type having means for moving a gear blank with a rolling, generating motion: tool carrying means comprising a carriage movable in a path parallel to the rolling motion of said gear blank, a tool supporting fixture including a sleeve, and clamping means in said sleeve for engaging a blade-like cutting tool and providing for adjustment of said tool about the axis of said sleeve, said clamping means comprising a pair of longitudinally movable members having inclined surfaces thereon, said sleeve having cooperating inclined surfaces, and means for urging said members longitudinally against said cooperating surfaces in a manner to clamp said tool therebetween.

2. In a gear cutting machine of the type having means for moving a gear blank with a rolling, generating motion: tool carrying means comprising a carriage movable in a path parallel to the rolling motion of said gear blank, a tool supporting fixture including a sleeve, and clamping means in said sleeve for engaging a blade-like cutting tool and providing for adjustment of said tool about the axis of said sleeve, members movable radially of said sleeve to clamp said tool therebetween, means for thus moving said members radially, and other means for rotatably adjusting said members and for locking said members in adjusted position against rotation in said sleeve.

3. In a tool holder for adjustably mounting a blade-like tool, a sleeve having a cylindrical bore terminating at one end in a conically tapered portion, a pair of semi-cylindrical members in said bore having tapered ends, and a plug having tapered surfaces engageable with said ends and movable longitudinally in said bore into engagement with said members to force said members radially inward.

4. In a tool holder for adjustably mounting a blade-like tool, a sleeve having a cylindrical bore terminating at one end in a conically tapered portion, a pair of semi-cylindrical members in said bore having tapered ends, a plug having tapered surfaces engageable with said ends and movable longitudinally in said bore into engagement with said members to force said members radially inward, and a longitudinally adjustable abutment extending between said members to engage said tool.

5. A tool holder for a blade-like tool comprising a sleeve, radially movable clamping members in said sleeve, said members being rotatable in said sleeve and adapted to clamp said tool therebetween, said sleeve having a transverse slot therethrough, an adjusting and locking element extending through said slot and effective to rotate said member and to lock said members in adjusted position.

6. A tool holder for a blade-like tool comprising a sleeve, radially movable clamping members in said sleeve, said members being rotatable in said sleeve and adapted to clamp said tool therebetween, an adjustable abutment adapted to engage the back of said tool to adjust the same longitudinally of said sleeve.

7. In a machine of the character described a bracket having a sleeve carried thereby, means in said sleeve for supporting a blade-like tool extending from one end of said sleeve for adjustment longitudinally of and rotatably in said sleeve, and means for mounting said bracket for adjustment about an axis perpendicular to said sleeve and closely adjacent said one end thereof.

8. In a machine for cutting involute surfaces on gear teeth, a tool holder for a blade-like tool comprising means for adjusting said tool longitudinally in said holder, means for adjusting said tool about its longitudinal axis in said holder, and means for mounting said holder for adjustment about an axis perpendicular to the axis of said tool and adjacent the cutting edge thereof.

9. In a tool holder for adjustably mounting a blade-like tool, a sleeve having a bore terminating at one end in a conically tapered portion, a pair of clamping members movable radially, longitudinally, and rotatably in said bore and adapted to receive one end of the tool therebetween, said members both having conically tapered portions at both ends, a plug adjustably received in said sleeve at the end thereof opposite to the conically tapered portion of said bore, said plug having a convexly conical inner end engageable with the conical ends of said members adjacent thereto, means for adjusting said plug longitudinally of said bore to force said clamping members radially inward to clamp said tool.

10. In a tool holder for adjustably mounting a blade-like tool, a sleeve having a bore terminating at one end in a conically tapered portion, a pair of clamping members movable radially, longitudinally, and rotatably in said bore and adapted to receive one end of the tool therebetween, said members both having conically tapered portions at both ends, a plug adjustably received in said sleeve at the end thereof opposite to the conically tapered portion of said bore, said plug having a convexly conical inner end engageable with the conical ends of said members adjacent thereto, means for adjusting said plug longitudinally of said bore to force said clamping members radially inward to clamp said tool, said sleeve having a circumferential slot, and one of said members having a clamping and adjusting element extending through said slot for adjusting said members and tool about the axis of said bore.

11. In a tool holder for adjustably mounting a blade-like tool, a sleeve having a bore terminating at one end in a conically tapered portion, a pair of clamping members in said bore having tapered ends cooperating with the conically tapered portion of the bore and being radially movable in the bore to clampingly engage a blade-like tool positioned therebetween, and a plug extending into said bore and engageable with said clamping members, and means for effecting longitudinal movement of said plug, whereby to move said clamping members longitudinally and to urge said clamping members radially into clamping engagement with a blade-like tool located between said members.

MAX B. MENTLEY.